United States Patent
Zhang et al.

(10) Patent No.: US 11,018,547 B2
(45) Date of Patent: May 25, 2021

(54) ELECTRIC MOTOR

(71) Applicant: Johnson Electric S.A., Murten (CH)

(72) Inventors: Hong Jian Zhang, Shenzhen (CN); Bin Shi, Hong Kong (CN); Daniel Gerhard Pahner, Dresden (DE)

(73) Assignee: Johnson Electric International AG, Murten (CH)

( * ) Notice: Subject to any disclaimer, the term of this patent is extended or adjusted under 35 U.S.C. 154(b) by 0 days.

(21) Appl. No.: 15/471,580

(22) Filed: Mar. 28, 2017

(65) Prior Publication Data

US 2017/0288491 A1 Oct. 5, 2017

(30) Foreign Application Priority Data

Apr. 5, 2016 (CN) .................. 2016 1020 7583.4

(51) Int. Cl.
*H02K 5/15* (2006.01)
*H02K 5/167* (2006.01)
*H02K 7/08* (2006.01)

(52) U.S. Cl.
CPC ............ *H02K 5/15* (2013.01); *H02K 5/1672* (2013.01); *H02K 7/083* (2013.01); *H02K 2205/03* (2013.01)

(58) Field of Classification Search
CPC ...................................................... H02K 5/15
USPC .......................................................... 310/90
See application file for complete search history.

(56) References Cited

U.S. PATENT DOCUMENTS

| | | | |
|---|---|---|---|
| 5,412,266 A | 5/1995 | Okazaki et al. | |
| 2005/0225185 A1* | 10/2005 | Mayumi | H02K 5/1672 310/90 |
| 2005/0264117 A1* | 12/2005 | Hata | H02K 1/28 310/90 |
| 2008/0152270 A1* | 6/2008 | Engesser | F16C 17/10 384/107 |
| 2010/0176672 A1* | 7/2010 | Abe et al. | H02K 5/225 310/71 |
| 2013/0234363 A1* | 9/2013 | Nagai | H01F 41/02 264/261 |
| 2013/0293061 A1* | 11/2013 | Neuroth | F16C 17/04 310/261.1 |

FOREIGN PATENT DOCUMENTS

| | | |
|---|---|---|
| CN | 1078074 A | 11/1993 |
| CN | 204152948 U | 2/2015 |
| JP | H1332208 A | 11/1999 |

* cited by examiner

*Primary Examiner* — Terrance L Kenerly
(74) *Attorney, Agent, or Firm* — Muncy, Geissler, Olds & Lowe, P.C.

(57) ABSTRACT

An electric motor includes a rotor with a rotor shaft mounted in at least one bearing bush of a friction bearing, a stator which surrounds the rotor, and at least one circular bearing plate which, relative to the rotor shaft, is mounted on the rotor shaft for co-rotation. An inner contour of the bearing plate surrounds a circumference of the rotor shaft by press-fit. The inner contour of the bearing plate is defined by at least two internal dimensions, wherein at least one internal dimension is smaller than the diameter of the rotor shaft. The at least one bearing plate is deformed in an axial direction when the bearing plate is in the pressed-in state on the rotor shaft.

10 Claims, 2 Drawing Sheets

ELECTRIC MOTOR

CROSS REFERENCE TO RELATED APPLICATIONS

This non-provisional patent application claims priority under 35 U.S.C. § 119(a) from Patent Application No. 201610207583.4 filed in China on 5 Apr. 2016.

FIELD OF THE INVENTION

This invention relates to an electric motor and in particular, to an electric motor lowering the rattling noise.

BACKGROUND OF THE INVENTION

During operation, an electric motor makes a typical motor sound. Such a motor sound occurs for example with multiphase claw-pole motors. Depending on the installation position, control mode, temperature or load, the motor has a tendency to rattle, that is to say the rotor oscillates forwards and backwards in an axial direction. This phenomenon has long been known about and arises regularly in motors. The noise means that the motor may be significantly louder than a motor without a rattling noise.

Various measures are known from the prior art which aim to avoid or reduce noises. These measures include applying a preload by means of an axial spring and using special materials with vibration-reducing properties.

These and other known solutions, however, are associated with considerable disadvantages. For example, softer vibration-reducing materials such as for example polyethylene (PE) or polytetrafluoroethylene (PTFE) are subject to a higher degree of wear and tear with an axial load and high temperatures.

A preload with additional spring leads to a permanent grinding noise and increases the number of components. Damping with a pad of grease is not stable in the long term or temperature-stable.

The task of the invention consists of providing a motor in which the rattling noise is avoided by a cost-effective means.

BRIEF DESCRIPTION OF THE DRAWINGS

The invention will now be more particularly described, by way of example only, with reference to the accompanying drawings, in which.

DETAILED DESCRIPTION OF THE PREFERRED EMBODIMENTS

Figure 1:
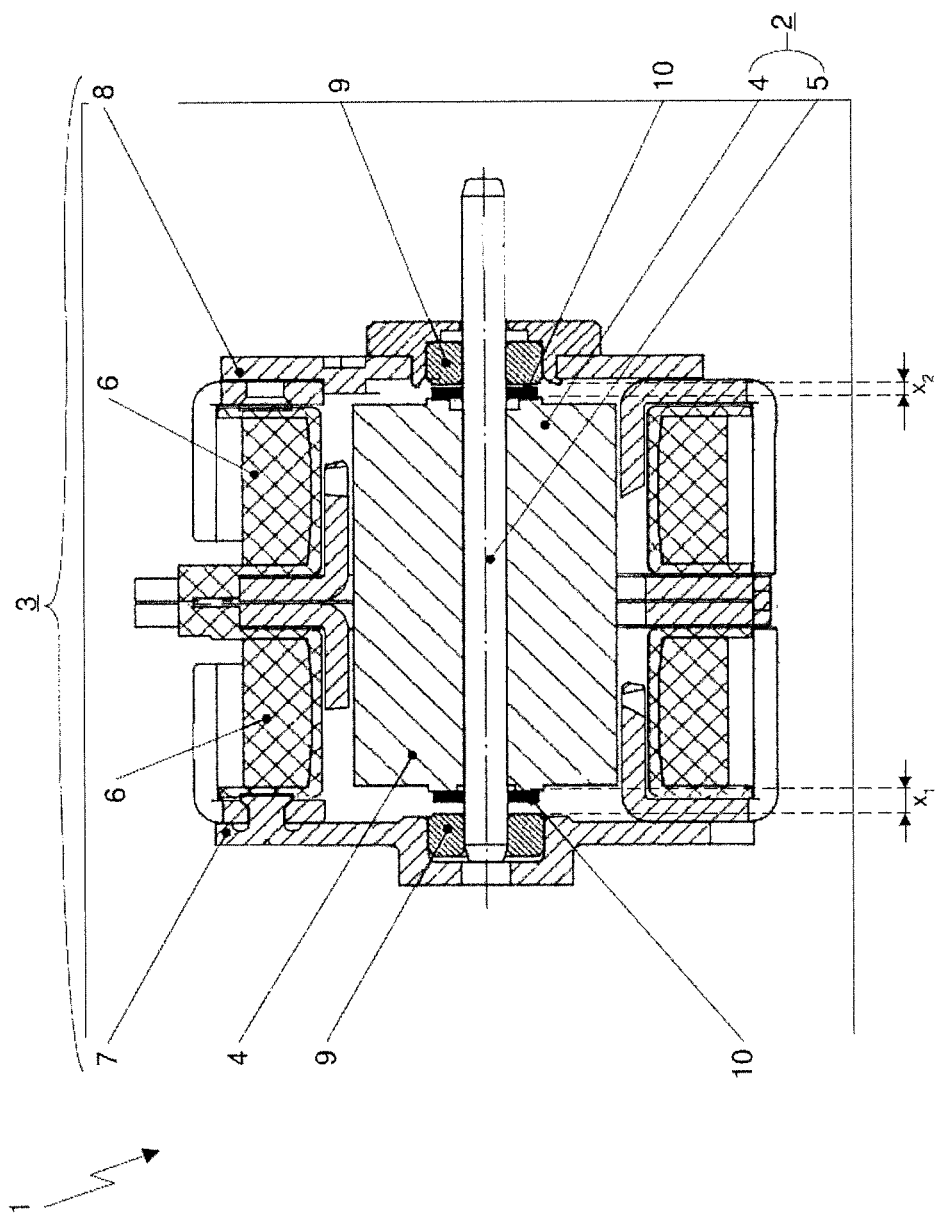
FIG. 1 illustrates a sectional view of an electric motor according to one embodiment of the present invention, wherein the electric motor comprising at least one bearing plate.

Referring to Figures of the drawings, there is shown one embodiment of an electric motor 1 with a rotor 2 and a stator 3 which surrounds the rotor 2.

The rotor 2 comprises a magnet 4 made of permanent-magnetic or magnetically soft material and a rotor shaft 5, whereby the magnet 4 comprises a cylindrical design and is attached to the rotor shaft 5 for co-rotation and arranged coaxially in relation to the latter. The stator 3 essentially has a hollow cylindrical design and is likewise arranged coaxially in relation to the rotor shaft 5.

In at least one embodiment, the stator 3 comprises several stator plates 6 with coils which surround the cylindrical magnet 4 for the purpose of magnetic interaction with it. On the faces of the stator 3, which is essentially of hollow cylindrical design, there is in each case a cover 7, 8 on the inner sides of the covers 7, 8, in each case a bearing bush 9 of a friction bearing, preferably a sintered bearing, is positioned in the centre and attached. The rotor shaft 5 is mounted in the bearing bushes 9.

The electric motor 1 comprises two circular bearing plates 10 connected to the rotor shaft 5 for co-rotation. Each bearing plate 10 surrounds, with its inner contour, the rotor shaft 5 on the latter's circumference and in the process makes contact at at least two points. With the plate surface which in each case is directed outwards, the bearing plates 10 contact the relevant neighbouring bearing bush 9 permanently or temporarily.

The bearing plates 10 are in each case located in the axial gap x1, x2 between the magnet and the bearing bushes 9. The distance between the inner surfaces of the two bearing bushes 9 is slightly larger than the distance between the outer surfaces of the two bearing plates 10, which enables clearance of the rotor 2 in an axial direction.

In at least one embodiment, connections between the circumference of the rotor shaft 5 and the inner contours of the bearing plates 10 for co-rotation is in the form of press fits. Thereby it is ensured that the bearing plates 10 are, in relation to the rotor, mounted for co-rotation, and run against the bearing bush 9 of the relevant neighbouring friction bearing.

In at least one embodiment, this press fit may be, but does not have to be, executed so as to run all the way around the shaft. Thereby it is ensured that the bearing plate is, in relation to the rotor, mounted for co-rotation, and runs against the friction bearing. Advantageously, the bearing plate is so designed that it becomes deformed through the pressing onto the rotor shaft in an axial direction, i.e. in the direction of the longitudinal axis of the rotor shaft, or is deformed before the pressing (on). The stop face against the friction bearing thus becomes smaller and axial impacts of the rotor against the friction bearing are cushioned.

The pressed-on bearing plate 10 is slightly deformed in an axial direction, which is not explicitly shown in FIG. 1. The result of this deformation is that the stop surface against the bearing bush 9 of the friction bearing is reduced and axial impacts of the rotor 2 against the friction bearing are cushioned.

Figure 2:
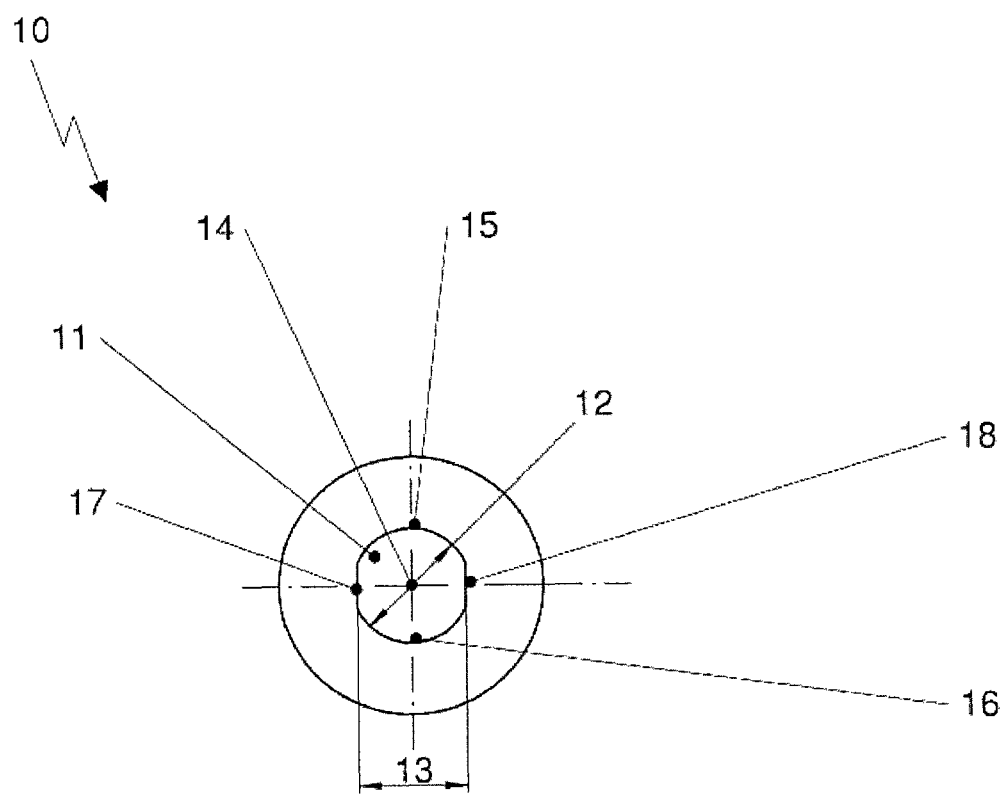
FIG. 2 illustrates a schematic diagram of the bearing plate of FIG. 1.

FIG. 2 shows a detailed view of an embodiment for the bearing plate 10. In at least one embodiment, the inner contour 11 of the bearing plate 10 is defined by at least two internal dimensions 12, 13, of which at least one internal dimension 13 is smaller than the diameter of the rotor shaft. The internal dimension 12, 13 is, within the scope of this invention, defined as the distance between two opposing points of the inner contour 11 of the bearing plate 10 surrounding the rotor shaft, whereby these opposing points are, in each case, arranged along a notional straight line that runs through the centre 14 of bearing plate 10 or, in the case of opposing parallel straight lines, than their distance apart.

The inner contour 11 of the bearing plate 10 is formed, as shown in FIG. 2 by two arcs 15, 16 with the same radius whose inner sides face each other and two opposing parallel straight lines 17, 18 which connect the ends of the opposing arcs 15, 16 to each other. In at least one embodiment, the radius of the opposing arcs 15, 16 preferably corresponds to half of the diameter of the shaft or is larger, and the distance between the opposing parallel lines is, in this embodiment, by contrast, smaller than the diameter of the rotor shaft.

One internal dimension 12 is produced from the distance of the opposing arcs 15, 16 along an arbitrary notional straight line through the centre 14. This distance as internal diameter 12 may be larger than the diameter of the rotor shaft or equal to the diameter of the rotor shaft.

The inner contour 11 is therefore, in this embodiment, partially circular, i.e. formed as a circle interrupted by flat sections in the form of the straight lines 17, 18. A second internal dimension 13 is produced from the distance between the opposing parallel lines 17, 18 and is preferably smaller than the diameter of the rotor shaft.

In accordance with the present invention, a circular bearing plate does not necessarily have to mean a bearing plate with a round outer contour. For example, the outer contour of the circular bearing plate may have a round, oval, square or hexagonal design while the inner contour is designed according to the above features. Preferably the outer circumference of the bearing plate is a circular disc or has a hexagonal outer contour.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. An electric motor, comprising:
   a rotor with a rotor shaft mounted in at least one bearing bush of a friction bearing;
   a stator, which surrounds the rotor; and
   at least one bearing plate connected to the rotor shaft for co-rotation, an inner contour of the bearing plate surrounding an outer contour of the rotor shaft;
   wherein the inner contour of each cross section of the bearing plate is defined by at least two internal dimensions along a radial direction of the bearing plate, wherein at least one internal dimension of the bearing plate is smaller than the diameter of the rotor shaft, a part of the rotor shaft surrounded by the bearing plate has a uniform circular cross section, wherein a shape of the outer contour of the part of the rotor shaft surrounded by the bearing plate is different from a shape of the inner contour of each cross section of the bearing plate;
   wherein the at least one bearing plate is deformed in an axial direction when the bearing plate is in the pressed-in state on the rotor shaft.

2. An electric motor as claimed in claim 1, wherein a second internal dimension of the inner contour of the bearing plate is larger than the diameter of the rotor shaft or equal to the diameter of the rotor shaft.

3. An electric motor as claimed in claim 1, wherein the rotor shaft is mounted in two bearing bushes on two opposing faces of the electric motor, and there are two bearing plates are connected to the rotor shaft in the way that the plate surfaces directed outwards in the direction of the faces during operation.

4. An electric motor as claimed in claim 3, wherein each bearing plate contact the relevant neighbouring bearing bush permanently or temporarily.

5. An electric motor as claimed in claim 1, wherein the friction bearing is a sintered bearing.

6. An electric motor as claimed in claim 1, wherein the inner contour of the bearing plate is formed by two arcs with the same radius whose inner sides are facing each other and two opposing parallel straight lines connecting the ends of the arcs to each other.

7. An electric motor as claimed in claim 6, wherein the radius of the opposing arcs corresponds to half of the diameter of the rotor shaft, and the distance between the opposing parallel straight lines is smaller than the diameter of the rotor shaft.

8. An electric motor, comprising:
   a rotor with a rotor shaft mounted in at least one bearing bush of a friction bearing;
   a stator, which surrounds the rotor; and
   at least one bearing plate connected to the rotor shaft for co-rotation, an inner contour of the bearing plate surrounding an outer contour of the rotor shaft;
   wherein a part of the rotor shaft surrounded by the bearing plate has a uniform circular cross section, wherein the inner contour of each cross section of the bearing plate is defined by at least two internal dimensions along a radial direction of the bearing plate, wherein one internal dimension of the bearing plate is smaller than the diameter of the part of the rotor shaft with circular cross section surrounded by the bearing plate and a second internal dimension of the bearing plate is greater than or equal to the diameter of the part of the rotor shaft with circular cross section surrounded by the bearing plate.

9. An electric motor as claimed in claim 8, wherein the at least one bearing plate is deformed in an axial direction by pressing the bearing plate on the rotor shaft.

10. An electric motor as claimed in claim 8, wherein the bearing plate, of which there is at least one, has a hexagonal outer contour.

\* \* \* \* \*